United States Patent
Walker et al.

(10) Patent No.: US 6,222,920 B1
(45) Date of Patent: *Apr. 24, 2001

(54) METHOD AND APPARATUS FOR VALUE-BASED QUEUING OF TELEPHONE CALLS

(75) Inventors: Jay S. Walker, Ridgefield; James A. Jorasch, Stamford; Thomas M. Sparico, Riverside, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,392

(22) Filed: Jul. 23, 1999

Related U.S. Application Data (63) Continuation of application No. 08/843,153, filed on Apr. 11, 1997, now Pat. No. 6,088,444.

(51) Int. Cl.[7] ............................ H04M 3/523; H04M 1/64; H04Q 3/64

(52) U.S. Cl. .................... 379/266; 379/88.16; 379/88.18

(58) Field of Search .................................... 379/265, 266, 379/309, 88.16, 88.18, 88.23, 201, 214, 308

(56) References Cited

U.S. PATENT DOCUMENTS

| | | | |
|---|---|---|---|
| 3,692,950 | 9/1972 | Lecoanet et al. | 379/266 |
| 4,071,698 | 1/1978 | Barger, Jr. et al. | 379/214 X |
| 4,145,578 | 3/1979 | Orriss | 379/266 X |
| 4,497,979 | 2/1985 | Phelan | 379/266 X |
| 4,757,529 | 7/1988 | Glapa et al. | 379/244 |
| 4,788,715 | 11/1988 | Lee | 379/88.16 X |
| 5,020,095 | 5/1991 | Morganstein et al. | 379/88.23 |
| 5,046,088 | 9/1991 | Margulies | 379/265 |

(List continued on next page.)

FOREIGN PATENT DOCUMENTS

| | | | |
|---|---|---|---|
| 863 651 A2 | 9/1998 | (EP) | 379/266 |

OTHER PUBLICATIONS

Inbound/Outbound Magazine, "IBM's Callpath Explained" by Bill Maikranz, Oct. 1989, pp 15, 16, & 18 379/266.

Inbound/Outbound Magazine, "The Smart Way to Handle Incoming Callers" by Keith Dawson, May 1990 pp 22–34 379/266.

Mosaix Inc., Investment Report, pp 1–12, Hambrecht & Quist Apr. 4, 1997.

PCT International Search Report dated Jul. 30, 1998 for Co–pending Foreign Related Application No. PCT/US98/01655.

Jackson, James R. "Queues with Dynamic Priority Discipline", Journal of the Institute of Management Science, Oct., 1961, pp. 18–34.

(List continued on next page.)

*Primary Examiner*—Harry S. Hong
(74) *Attorney, Agent, or Firm*—Dean P. Alderucci

(57) ABSTRACT

A priority call queuing system allows the called site to exercise control over the position in a phone queue of an incoming call, based upon an economic value assigned to the incoming call. When the incoming call is received, an interactive voice response unit interrogates the caller and determines information such as, identity of the caller, quantity of items to be ordered, item numbers, catalog numbers and other data from which an economic value of the call can be determined. Thereafter, the call information is used, in conjunction with pricing and other economic data, present in a database at the called site, to assign an economic value to the call. The call's position in the queue is then adjusted in manner that is hidden from the caller, in accordance with the determined economic value. The rank positions of other calls within the queue are adjusted, accordingly.

28 Claims, 10 Drawing Sheets

U.S. PATENT DOCUMENTS

| | | | |
|---|---|---|---|
| 5,164,983 | 11/1992 | Brown et al. | 379/265 |
| 5,166,974 | 11/1992 | Morganstein et al. | 379/266 |
| 5,208,848 | 5/1993 | Pula | 379/88.01 |
| 5,276,731 | 1/1994 | Arbel et al. | 379/88.2 |
| 5,278,898 | 1/1994 | Cambray et al. | 379/266 |
| 5,291,550 | 3/1994 | Levy et al. | 379/242 |
| 5,311,583 | 5/1994 | Friedes et al. | 379/209 |
| 5,329,583 | 7/1994 | Jurgensen et al. | 379/266 |
| 5,444,774 | 8/1995 | Friedes | 379/266 |
| 5,524,147 | 6/1996 | Bean | 379/265 |
| 5,561,707 | 10/1996 | Katz | 379/88.16 |
| 5,590,188 | 12/1996 | Crockett | 379/266 |
| 5,646,988 | 7/1997 | Hikawa | 379/266 |
| 5,684,872 | 11/1997 | Flockhart et al. | 379/266 |
| 5,857,018 | 1/1999 | Sumner et al. | 379/266 |
| 5,864,617 | 1/1999 | Donnelly | 379/266 |
| 6,088,444 | 7/2000 | Walker et al. | 379/266 |

OTHER PUBLICATIONS

Leibowitz, Ed, "Leaders of the switch–to–host–revolution; a sample of open PBXs . . . ", Teleconnect, Nov. 1991.

Jordan, Peter, "The Customer for Computer Telephony", Computer Reseller News, pp. 7A–8A, Jan. 15, 1996.

Nairn, Geoffrey, "Call Centres: A Vital Role in Customer Service", Financial Times, Jul. 2, 1997, Survey—FT Information Technology, p. 13.

Major, Raymond L., "A Visual Approach to Modeling, Simulation an Analysis", OR/MS Today, Oct. 1998.

Tanner, Todd, "The Virtual Call Center: Key to Customer Service", Business Communications Review, Dec., 1998, p. 29.

Ghio, Terry, "The Uncentered Call Center: Building Distributed or Virtual Call Centers with CTI and Internet Telephony" Call Center Solutions, May, 1999.

Anonymous, "Special TMC Labs Review: Skills–based routing: Matchmaking and the call center, Part I", Call Center Solutions, Apr., 2000, vol. 18, No. 10, pp 104–116.

Schultz, Brian, "Class–based queuing divvies Bandwidth", Network World, Jun. 12, 2000, vol. 17, No. 24, pp: 55.

MacPhee, Scott, "People, processes and technology: Eight tips for Web–enabling your call center", Call Center Solutions, Jul. 2000, vol. 19, No. 1, pp: 60–61+.

"CosmoCall ACD Features", (http://www.cosmocall.com), download date: Sep. 5, 2000.

CALL DATABASE 62

| PHONE NUMBER | CALL TRACKING NUMBER | POSITION IN QUEUE | TIME RECEIVED | PRODUCT ORDER NUMBER |
|---|---|---|---|---|
| (603)555-1212 | 4869 | 016 | 10:09 | BZ 061 |
| (203)555-1111 | 4896 | 025 | 10:22 | TW 426 |
| (413)555-1313 | 4912 | 005 | 10:15 | JS 908 |

FIG. 4A

PRODUCT ORDER DATABASE 64

| CALL TRACKING NUMBER | QUANTITY (NUMBER OF ITEMS) | ITEM NUMBERS | ITEM PRICES | ITEM DESCRIPTION | CATALOG NUMBER |
|---|---|---|---|---|---|
| 4869 | 2 | 56329, 45422 | $5.95, $12.67 | SET OF PENS, DICTIONARY | 056, 128 |
| 4896 | 1 | 43678, 67446 | $5.95, $7.25 | SET OF PENS, COFFEE MUG | 056, 057 |
| 4912 | 3 | 56332, 78955, 98711 | $11.50, $12.67, $24.98 | SHIRT, DICTIONARY, TELEPHONE | 058, 128, 059 |

FIG. 4B

| CALL TRACKING NUMBER | PRODUCT ORDER NUMBER | QUANTITY OF ITEMS | ASSIGNED ECONOMIC VALUE | POSITION IN QUEUE |
|---|---|---|---|---|
| 4869 | 462TX | 2 | $18.62 | 016 |
| 4896 | 985BT | 1 | $13.20 | 025 |
| 4912 | 556JJ | 3 | $49.15 | 005 |

VALUE DATABASE 66

METHOD AND APPARATUS FOR VALUE-BASED QUEUING OF TELEPHONE CALLS

CROSS REFERENCE TO RELATED APPLICATIONS

This application is a continuation of application Ser. No. 08/843,153, filed on Apr. 11, 1997, now U.S. Pat. No. 6,088,444, issued Jul. 11, 2000, and is related to U.S. Pat. No. 6,014,439, issued on Jan. 11, 2000.

FIELD OF THE INVENTION

The present invention relates to a system and method for controlled queuing of incoming calls to a vendor and, more particularly, to a system and method for changing an assigned position of a call in a queue, with the change being dependent upon the value of the call to the vendor.

BACKGROUND OF THE INVENTION

As more and more companies offer telephone access to a customer service staff, problems associated with waiting on hold have grown. Such problems include, for example, excessively long waits, full queues that cannot accept additional callers, and accidental disconnects. These problems have engendered a high level of frustration and ill will among callers. Some companies now routinely inform calling customers who are on hold how long a current wait is expected to last before a service representative will be available to take the call.

In general, when a caller is placed in a call queue, the caller's queue position is dependent upon the receipt time of the call at the vendor location. No consideration is given to the identity of the caller or the potential value of the call. While this is a democratic way to handle incoming calls, it may not be good for business. For instance, a large number of low business value calls may be in a queue when a high business value call is received. As a result, the high business value call is subjected to a long wait while the low business value calls are answered—with attendant dissatisfaction on the part of the high business value caller.

Some companies offer various levels of speed-of-answer services to their customers. This is especially important whereon hold time can tie up valuable business activities of the caller. Thus, a company might offer one "for cost" telephone number for a service which guarantees no more than a five-minute wait and another, less expensive, telephone number which guarantees that an agent will be available in no more than a one hour wait. Incoming callers are thus charged more for the shorter response guarantee time than for calls with a longer response guarantee time.

To implement an automatic call answering/queuing system of the type described above, manufacturers offer a range of products. Ordinarily, automatic call answering systems include a private branch exchange (PBX) which processes an incoming call and identifies the number dialed using a dialed number identification service function (DNIS). Once that information is stored, the PBX checks a routing database for DNIS routing instructions and routes the call to an automatic call distributor (ACD), which may be a separate entity or be incorporated into the PBX's functionality. The ACD logs each call in memory and assigns each call a rank based on, for instance, the order in which the call arrived. If there are currently N calls in a queue, the ACD normally assigns a next call received from the PBX to position N+1 in the queue.

When the PBX indicates to the ACD that an agent is available to answer a call, the call residing at the top of the queue in the ACD is removed and sent to the PBX, which takes the corresponding incoming line off hold and routes the call to the available agent. The ACD then moves up each call in the queue and the process continues.

If the system is provided with an automatic voice response capability, it includes an interactive voice response unit (IVRU). The IVRU is utilized to periodically communicate with incoming callers, indicating position in the queue and a waiting time until the call is expected to be answered.

U.S. Pat. No. 5,020,095 to Morganstein et al. describes a call processing apparatus which queues calls that are waiting to be connected to a service position. The apparatus calculates a queue position and wait time and transmits the queue data to the calling party. U.S. Pat. No. 5,444,774 to Friedes describes an interactive queuing system for a call center and collects initial information from the caller while the call is in the holding queue. The information input by the caller enables the apparat us to query a database and to retrieve additional information needed to service the caller's call. That information is then displayed to a next available agent when the call is received by that agent.

U.S. Pat. No. 5,561,707 to Katz describes a telephone interface system which is adapted to select or qualify a set of callers, acquire data from the callers in the set and to statistically analyze the acquired data. U.S. Pat. No. 4,788,715 to Lee describes an automatic call distributor system wherein calls waiting in a queue are informed of expected wait time until connection to an agent. The announcements are periodically updated to reassure customers that they are progressing in the queue. The customers are also given the opportunity to leave a message if they do not wish to wait in the queue.

While the prior art teaches a method for enabling a caller to arrange, prior to a call, for access to a priority queuing arrangement, there is need for a queuing control system which will enable a call center to arrange calls in a call queue in an order based on criteria other than the time of a call.

SUMMARY OF THE INVENTION

Accordingly, it is an object of this invention to provide a phone queuing system and method which enables the position of a call in a queue to be moved within the queue in accord with a determined criteria, other than a time of receipt of a call.

It is another object of this invention to provide a system and method for controlling a phone queuing system to reposition calls within the queue in a manner that may be masked from the caller.

In accordance with the invention, a priority call queuing system allows a called site to exercise control over the position in a queue of an incoming call which has been placed on hold due to the unavailability of an agent to immediately handle the call. When the incoming call is received, an interactive voice response unit interrogates the caller and determines caller information such as: identity of the caller, quantity of items to be ordered, item numbers, catalog numbers and other data from which an economic value of the call can be determined. Thereafter, the call information is used, in conjunction with pricing and other economic data present in a database at the called site, to assign an economic value to the call. The call's position in the queue is then adjusted in a manner that is masked from the caller, in accordance with the assigned economic value. The rank positions of other calls within the queue are then adjusted accordingly.

DETAILED DESCRIPTION OF THE INVENTION

Figure 1:
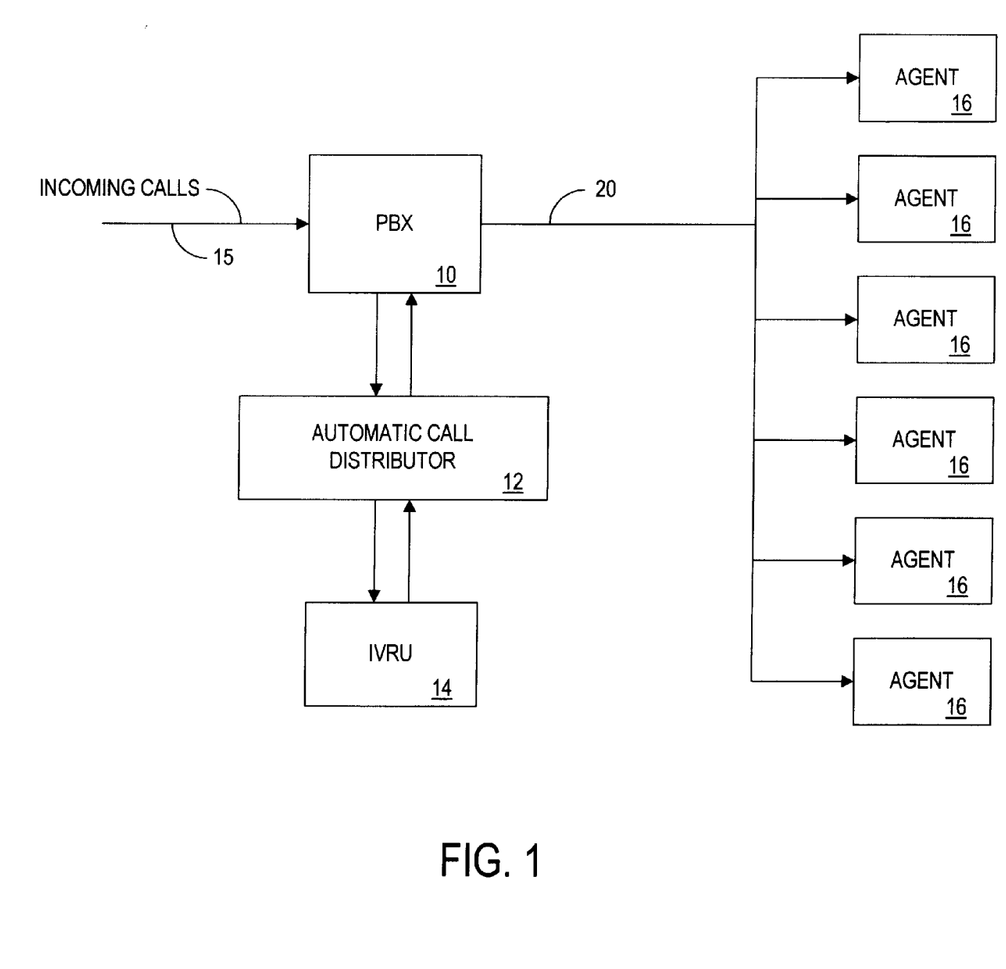
FIG. 1 is a block diagram illustrating a priority phone queuing system that incorporates the invention.

Referring to FIG. 1, a priority phone queuing system incorporating the invention comprises a PBX 10, an ACD 12 and an IVRU 14. PBX 10 receives incoming calls via trunk 15 and is connected to a plurality of agent terminals 16 via trunk 20. In the description which follows, it will be assumed that all agent terminals 16 are busy and that PBX 10 cannot respond to an incoming call by making a direct connection to an agent terminal 16. As a result, PBX 10 is forced to place the incoming call on hold. At the same time, PBX 10 determines the calling telephone number.

Call data associated with the call (i.e., calling number, time of call,etc.) is forwarded by PBX 10 to ACD 12. ACD 12 then creates a record based on the call in databases that are preferably maintained in the ACD. (It is to be understood that the databases to be described below may be maintained in PBX 10 rather than ACD 12). ACD 12 then provides a signal to IVRU 14 to communicate with the caller and to obtain certain data regarding the subject of the call which will enable an economic value to be assigned to the call. As an example, assume that the called site offers products for sale. In such a case, IVRU 14 queries the caller regarding the identity and quantity of items to be ordered, catalog number, etc.

The caller's responses to the queries are preferably caller-entered DTMF signals that are converted into data values by IVRU 14. Those values are then transmitted to ACD 12 which updates its databases regarding the call. Thereafter, ACD 12 determines, for example, the cost of the items to be ordered so as to develop an estimated total value of the order and enters the total value into its databases.

Once the order data and related value data have been stored, ACD 12 calculates and assigns a value to the order which is representative of its economic value. ACD 12 then reviews the call queue to determine which orders, if any, have a higher assigned economic value then a current call being considered. If there are none, the current call is ranked first in the queue and its queue position is updated accordingly. If the current call has a lower economic value than any call in the queue, then the current call is ranked last and its position in the queue is assigned accordingly. If the current call value is somewhere in the middle of the queue, ACD 12 finds the closest two economic values, i.e., higher and lower, and assigns the current call to the queue at a position between the two calls. The remaining call positions are then reordered accordingly. Thereafter, the queue is handled in the conventional manner, with ACD 12 removing each call from the top of the queue as an agent terminal 16 becomes available.

The economic value of a call can be based upon a total number of items to be ordered, a total dollar amount of the order and/or the profitability of the order and the status of the customer. The customer status is indicative of a level of importance of the calling customer. For example, a customer who averages six orders of over $100 each per year may have a higher status than a customer who averages one $200 order per year. The originating location of the call may also be used in determining the economic value of the call. Each of the aforesaid methods of valuation equates to assigning an economic value to the call, with the economic value being particularly relevant to the organization receiving the call.

Figure 2:
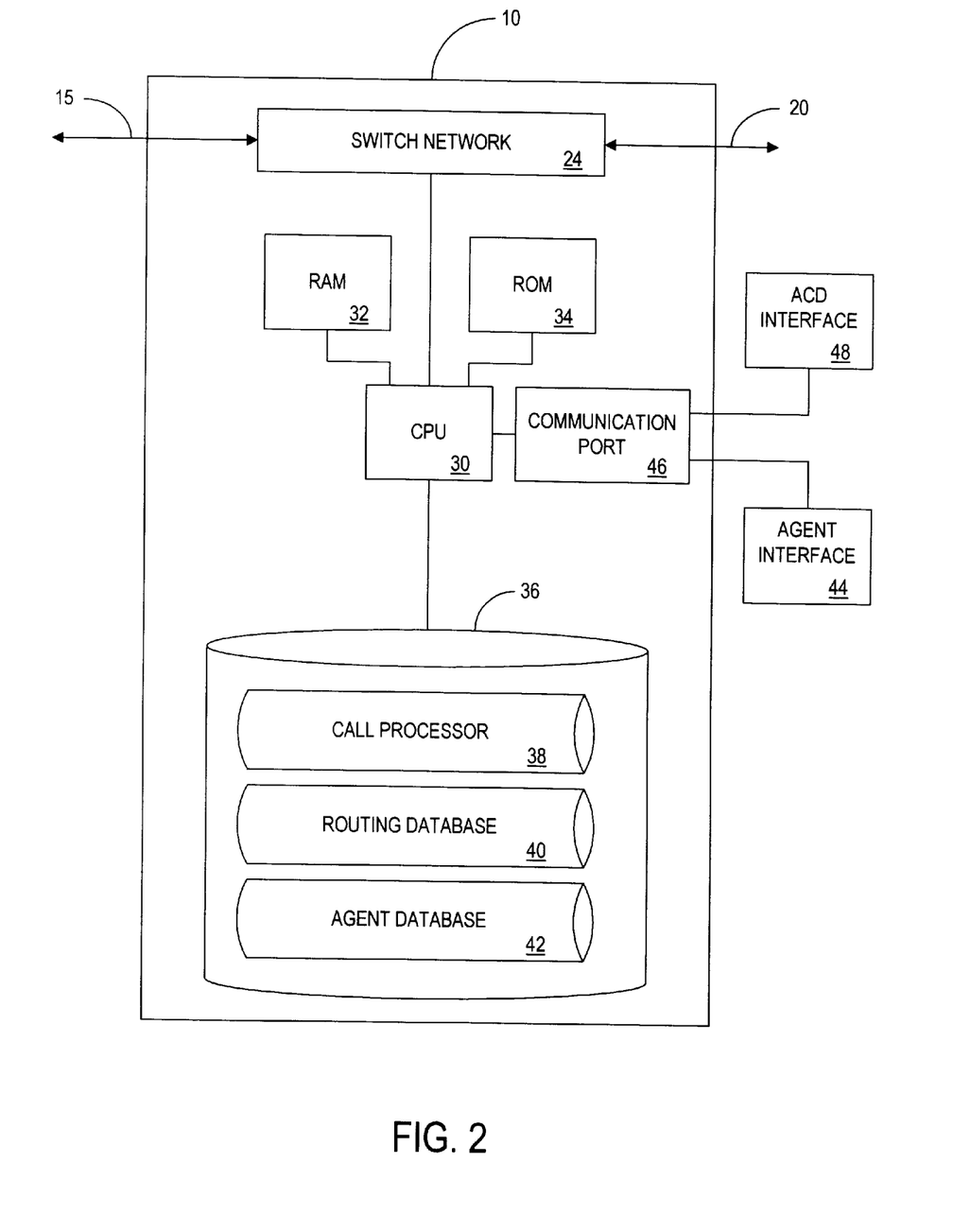
FIG. 2 is a block diagram of the private branch exchange (PBX) of FIG. 1.

FIG. 2 illustrates components of PBX 10 which include a conventional switch network 24 that receives incoming calls via trunk 15 and provides outgoing connections to various ones of agent terminals 16 (FIG. 1) via trunk 20. The operation of PBX 10 is controlled by a central processing unit (CPU) 30 which is, in turn, controlled by procedures stored in random access memory (RAM) 32 and read-only memory (ROM) 34.

Control procedures and databases used by CPU 30 are held in data storage device 36 (e.g. a hard disk drive) and are selectively downloaded to RAM 32, as needed. Stored therein are a call processor routine 38, a routing database 40 and an agent database 42. Call processor routine 38, when loaded into RAM 32, directs the handling of incoming calls and control of switch network 24 in a manner described herein below. Routing database 40 maintains the necessary internal routing information regarding agent terminals 16 (and any other terminals that are connected to PBX 10). Agent database 42 provides further information regarding each agent terminal and is utilized to enable the routing of control signals and telephone calls between PBX 10 and the individual agent terminals 16.

PBX 10 controls communications with each of agent terminals 16 via a communication port 46 and an agent interface 44, with the signaling occurring over control wiring (not shown). The signaling may, alternatively, be carried over the internal telephone network. An ACD interface 48 enables PBX 10 to communicate with ACD 12 (shown in FIG. 3).

Figure 3:
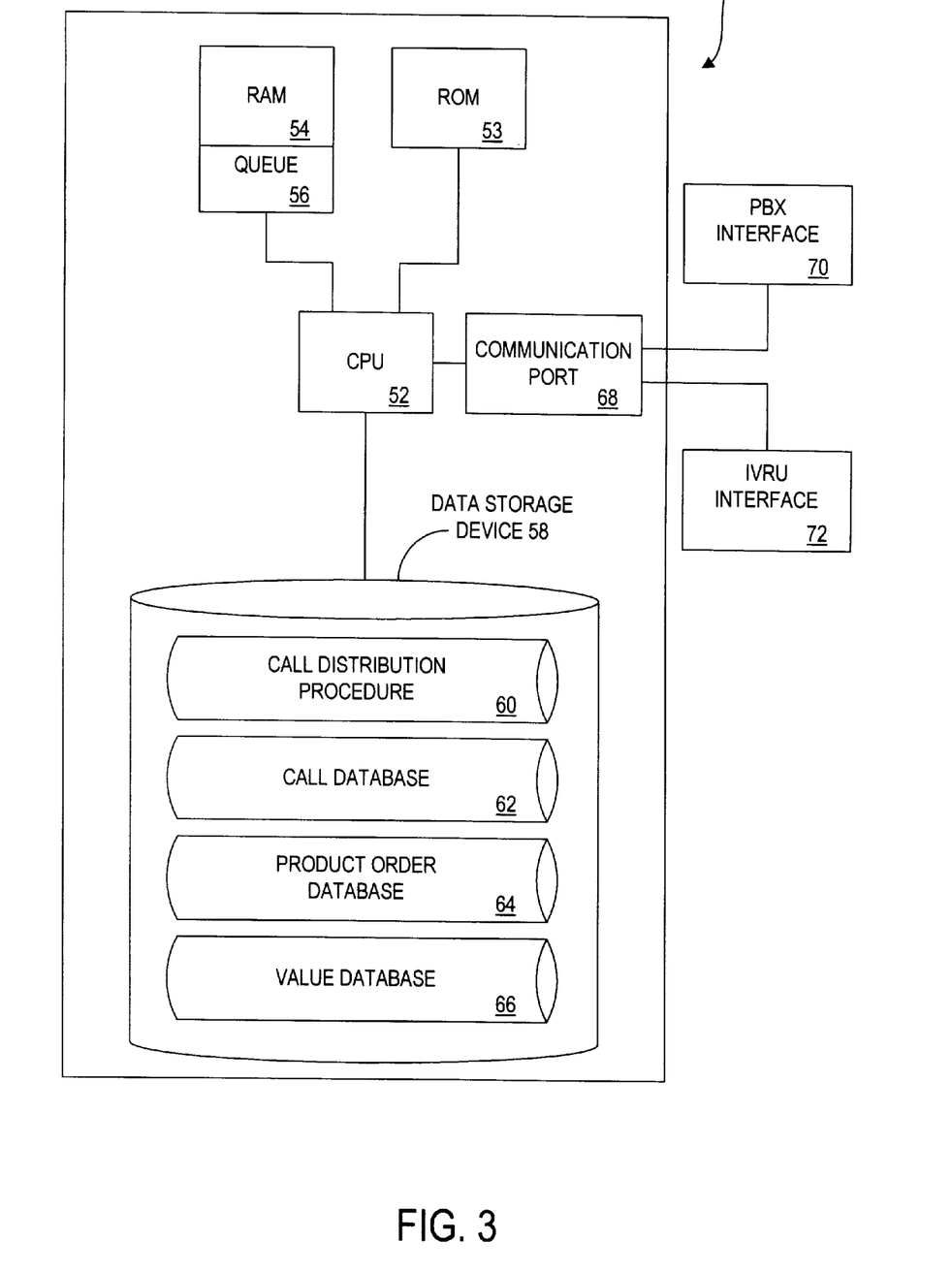
FIG. 3 is a block diagram of the automatic call distributor (ACD) of FIG. 1.

Referring to FIG. 3, ACD 12 is controlled by a CPU 52 and includes a ROM 53 and a RAM 54, the latter of which maintains a queue 56 (or queues) of calls awaiting connection to an agent terminal 16. ACD 12 communicates with PBX 10 via communication port 68 and PBX interface 70, and with IVRU 14 via IVRU interface 72.

A data storage device 58 includes a call distribution procedure 60 that enables handling of queue 56 and other functions performed by ACD 12, to be hereafter described. Data storage device 58 further includes a call database 62, a product order database 64 and a value database 66, all of which will be hereafter described in conjunction with the schematic illustrations of FIGS. 4a–4c.

It is to be understood that PBX 10, ACD 12 and IVRU 14 are all commercially available units. For instance, the Ameritech Corporation's Call Center provides automated call attendant functions, automatic call distributor functions and interactive voice response functions.

Figure 4A:
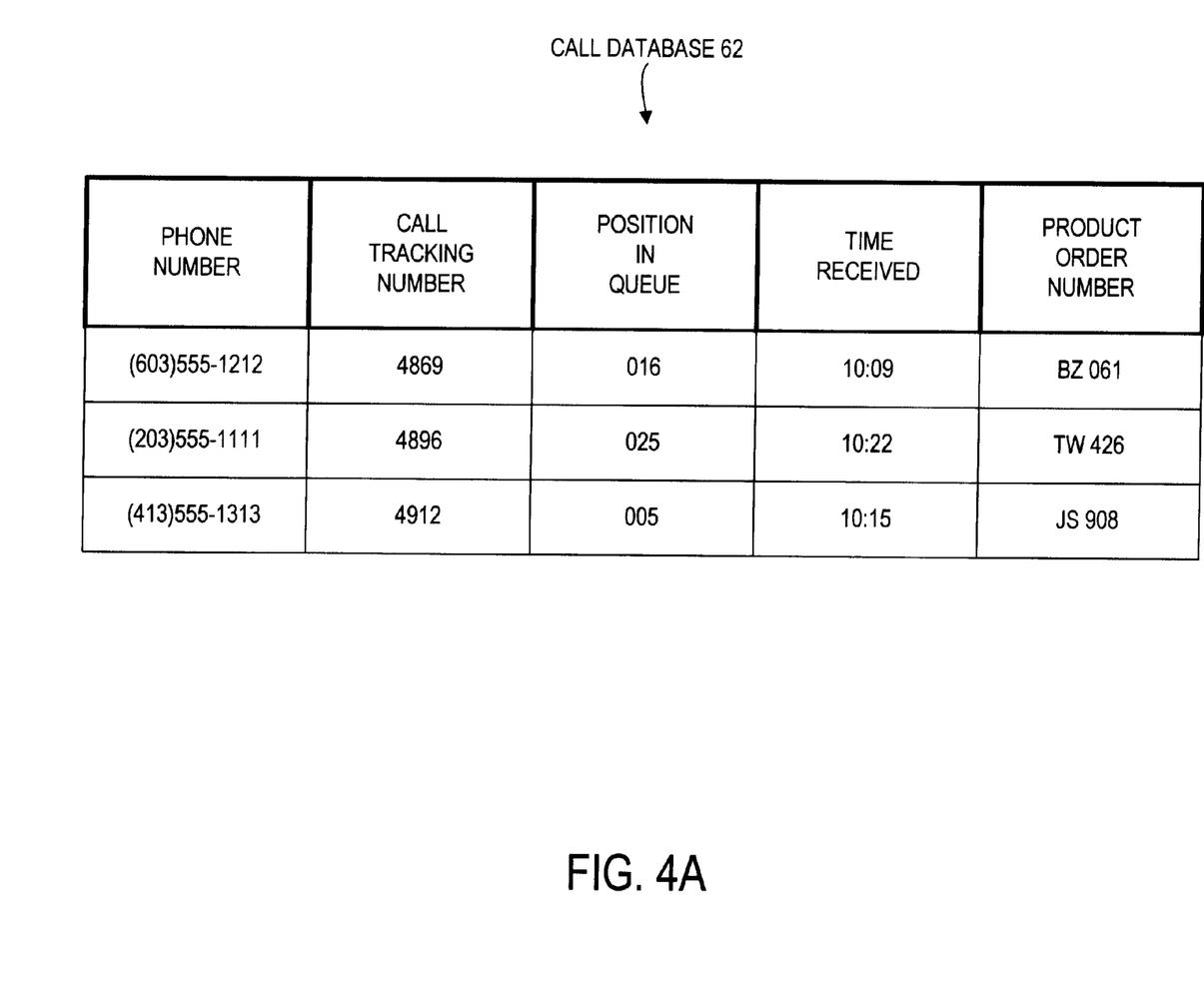
FIG. 4a is a schematic drawing showing a call database maintained within the PBX of FIG. 2.
Figure 4B:
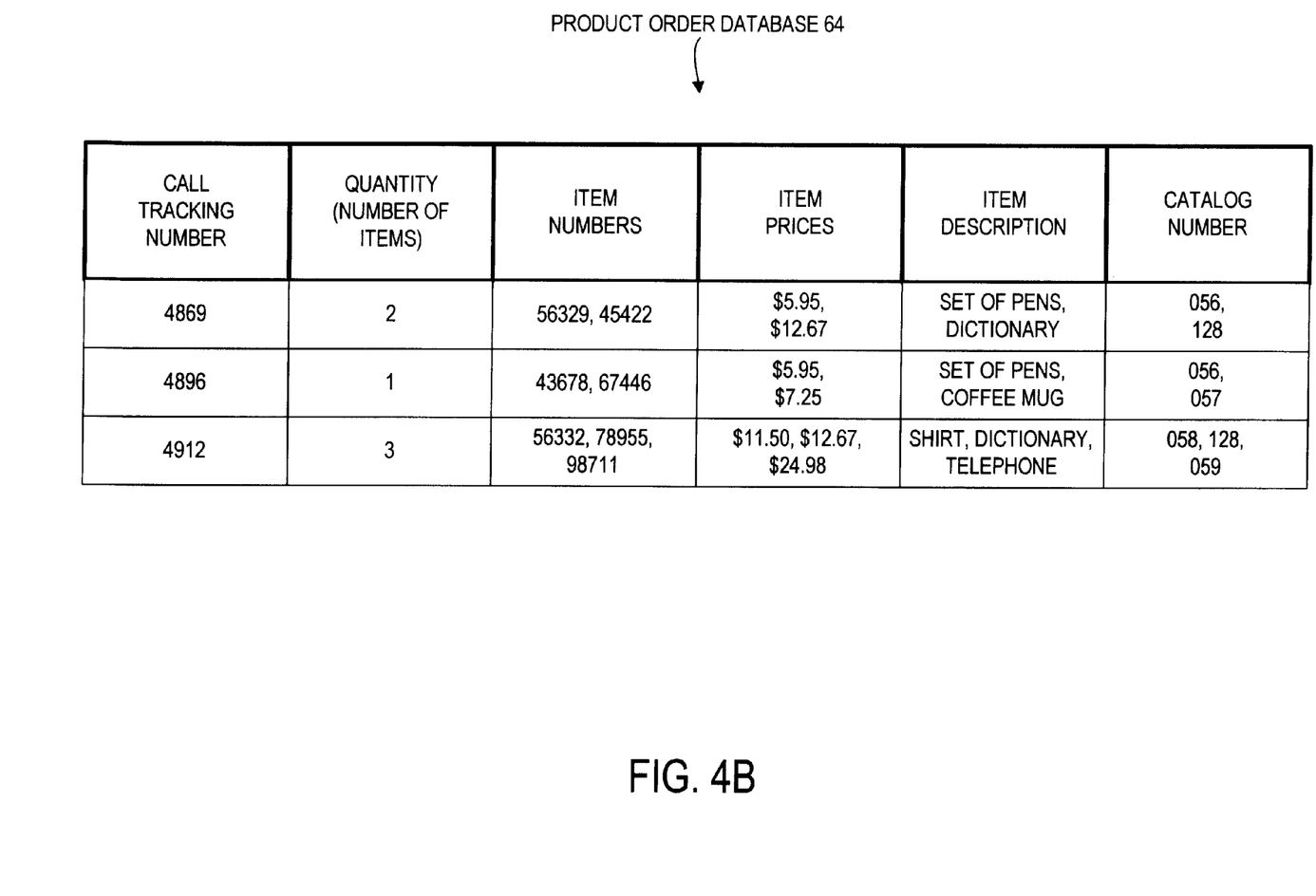
FIG. 4b is a schematic drawing of a product order database maintained within the ACD of FIG. 3.
Figure 4C:
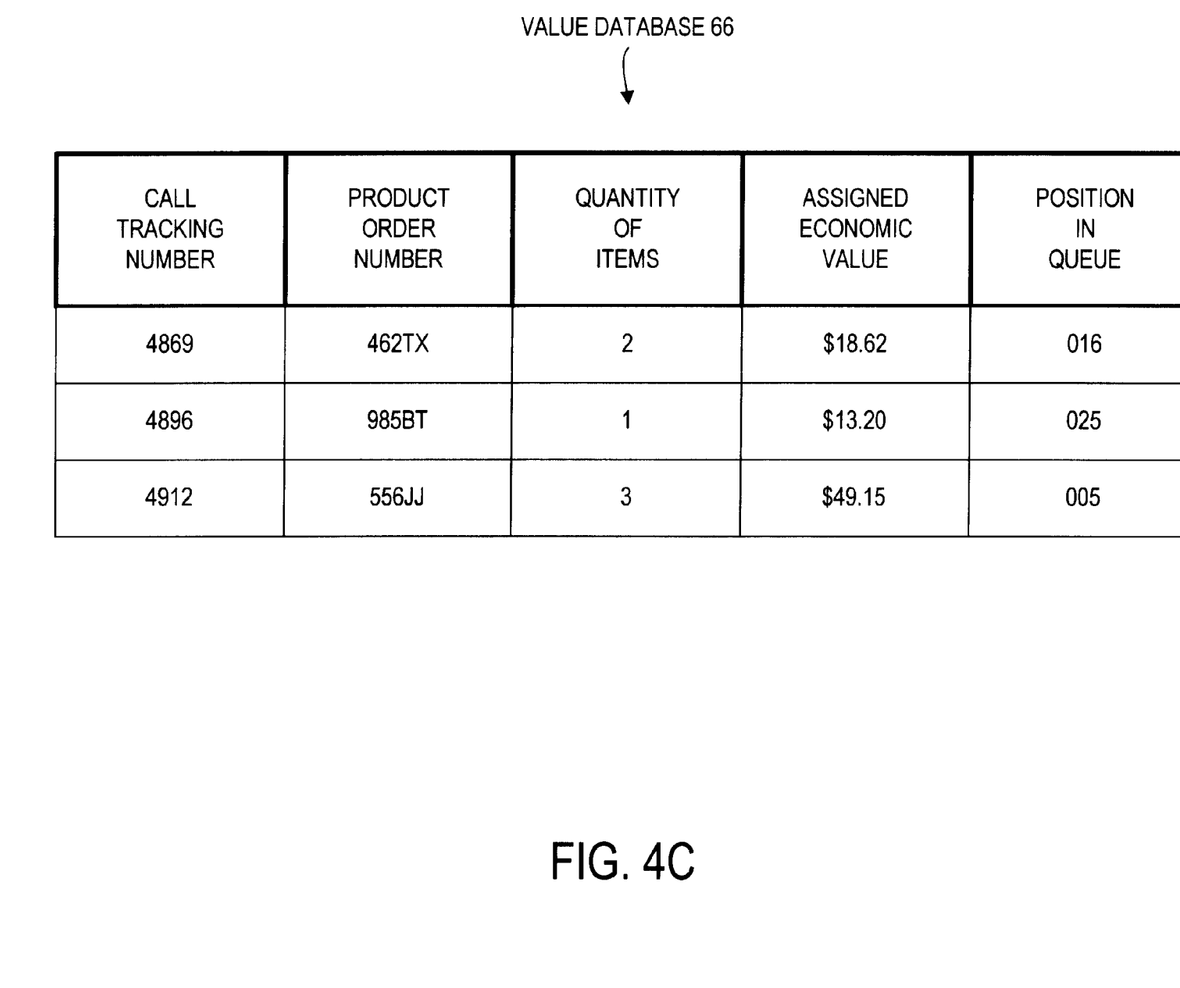
FIG. 4c is a schematic drawing of a value database maintained within the ACD of FIG. 3.

Turning now to FIGS. 4a–4c, three databases are schematically illustrated which aid in the implementation of the invention. Call database 62 (FIG. 4a) includes: a listing of the calling phone number, a call tracking number assigned by ACD 12, the position of the call within a call queue, assigned and updated by ACD 12, a time received value which indicates the time the call was received by PBX 10, and one or more product order number(s), derived from an interactive process with the caller to be described below.

Product order database 64 (FIG. 4*b*) includes, for each call, the following entries: the call tracking number for the call, the quantity of items ordered, the item numbers of the items ordered, the item price and item description, and a catalog number for each ordered item. While the system provides the call tracking number, the remaining data is obtained from the caller. Alternatively, the system may include locally, or through remote access, pricing data. Thus, only an item descriptor such as a catalog number need be obtained from the caller.

Value database 66 (FIG. 4*c*) includes, for each call, the call tracking number, a product order number, the quantity of items ordered, an assigned economic value as calculated by ACD 12 in a manner described below, and a resultant queue position assigned by ACD 12.

The data contained within call database 62, product order database 64 and value database 66 are employed to enable ACD 12 and IVRU 14 to determine the economic value of a current call and the positioning of the current call in a queue.

It will be understood that the above-described databases are intended to illustrate one embodiment of the present invention. Many alternative database structures and methods of performing the desired functions will be apparent to those skilled in the art.

Referring to the flow diagrams of FIGS. 5–8, the process employed by the present invention will be described. An incoming call is received by PBX 10 (box 100). PBX 10 determines the called telephone number and any corresponding extension (box 102). PBX 10 then identifies the caller's phone number (box 104) and next identifies the route to the called number by accessing a dialed number identification service (DNIS) (box 106). Once the routing information is obtained from the DNIS, the current call is put on hold and data regarding the current call is routed to ACD 12 and IVRU 14 (box 108).

Figure 5:
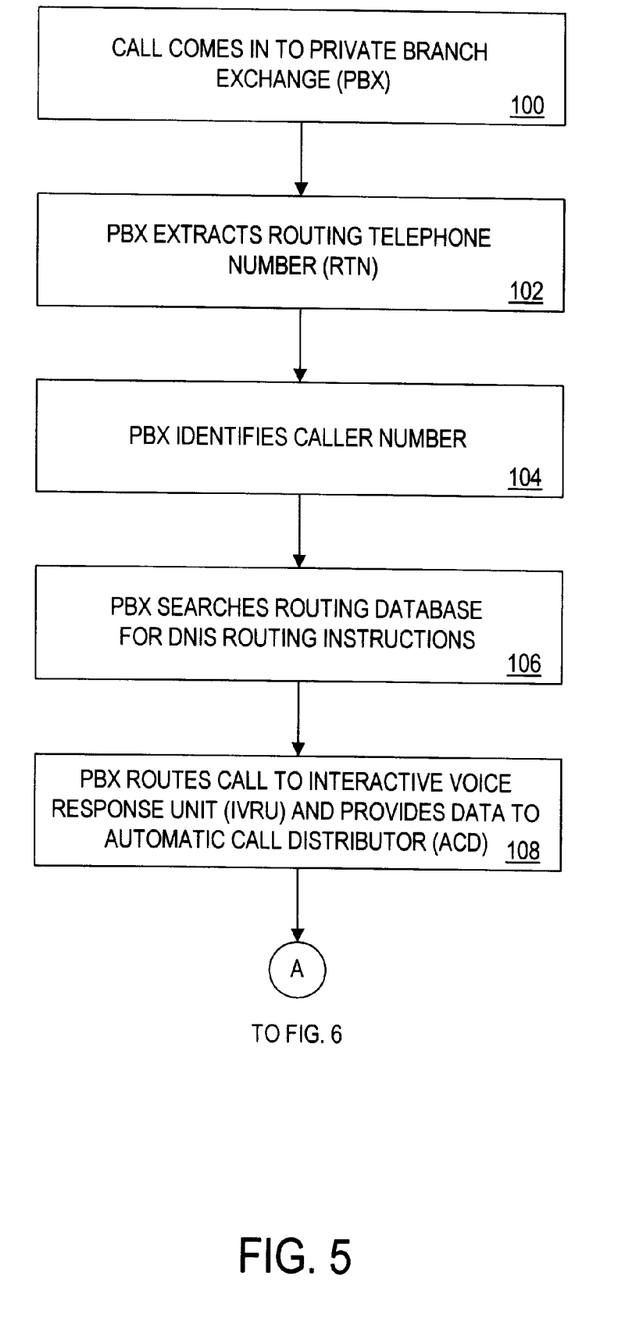
FIGS. 5–8 comprise a flow chart illustrating the process by which calls are processed in rank.

ACD 12 logs the call and updates call database 62 by establishing a record for the call, placing the call in call queue 56, and, thereafter, recording the data received from IVRU 14 (described below) regarding the call in the call database.

Figure 6:
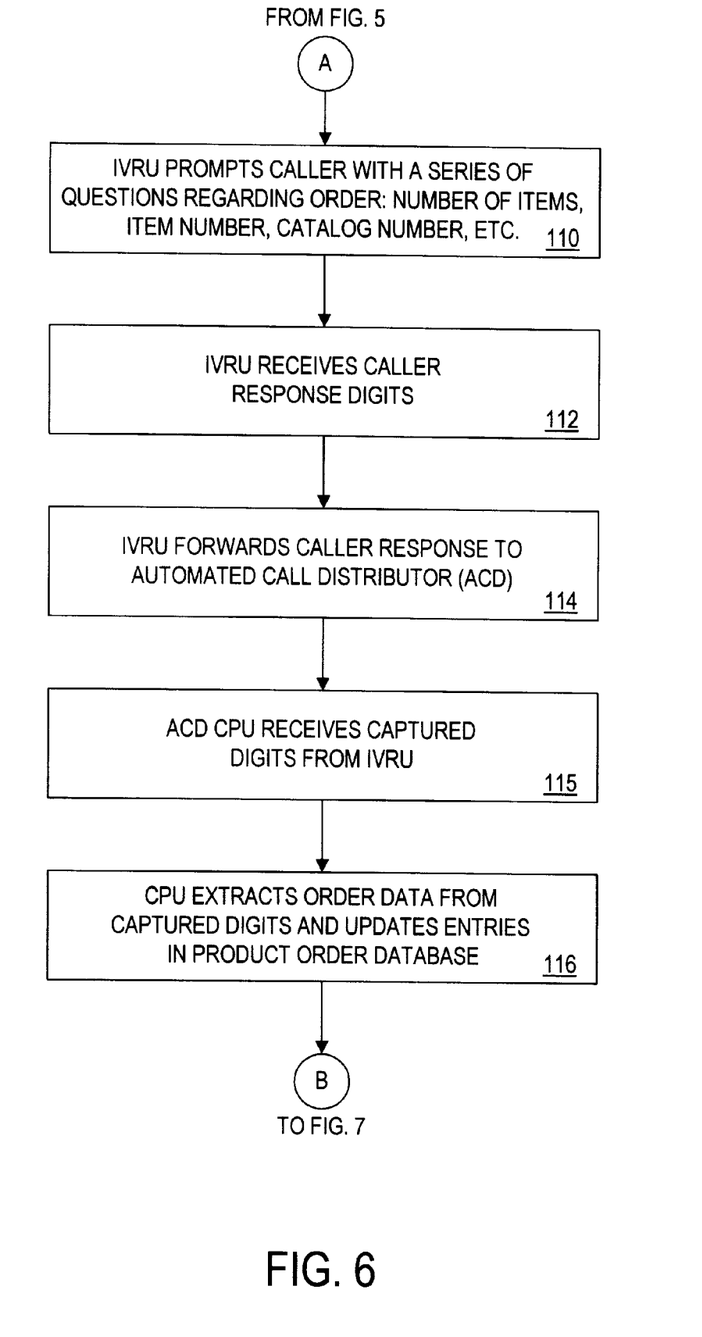

Next, IVRU 14 queries the caller regarding the subject of the call. IVRU 14 will have prestored therein a script which is utilized during the caller query action. Using the script, IVRU 14 queries the current caller with a series of questions which inquire into the details of an order (box 110). These details include, for example, the quantity of items being ordered, identifying item numbers, catalog numbers, etc. IVRU 14 records the caller responses (via received signals from the caller's touch-tone key entries) (box 112). Those responses are then forwarded by IVRU 14 to ACD 12 (box 114). CPU 52 of ACD 12 receives the caller responses from IVRU 14 (box 115) and extracts the corresponding order data (box 116).

Figure 7:
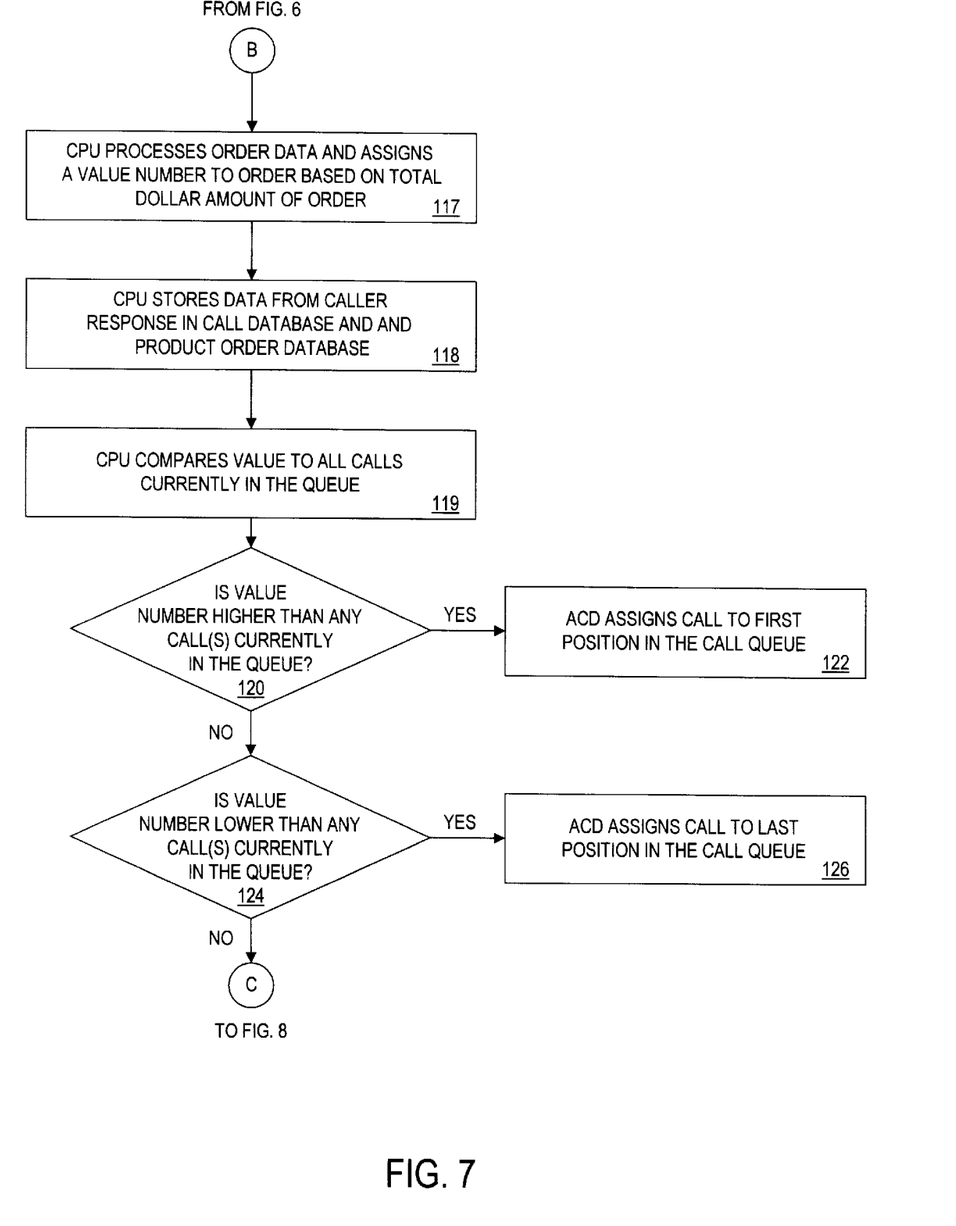
Figure 8:
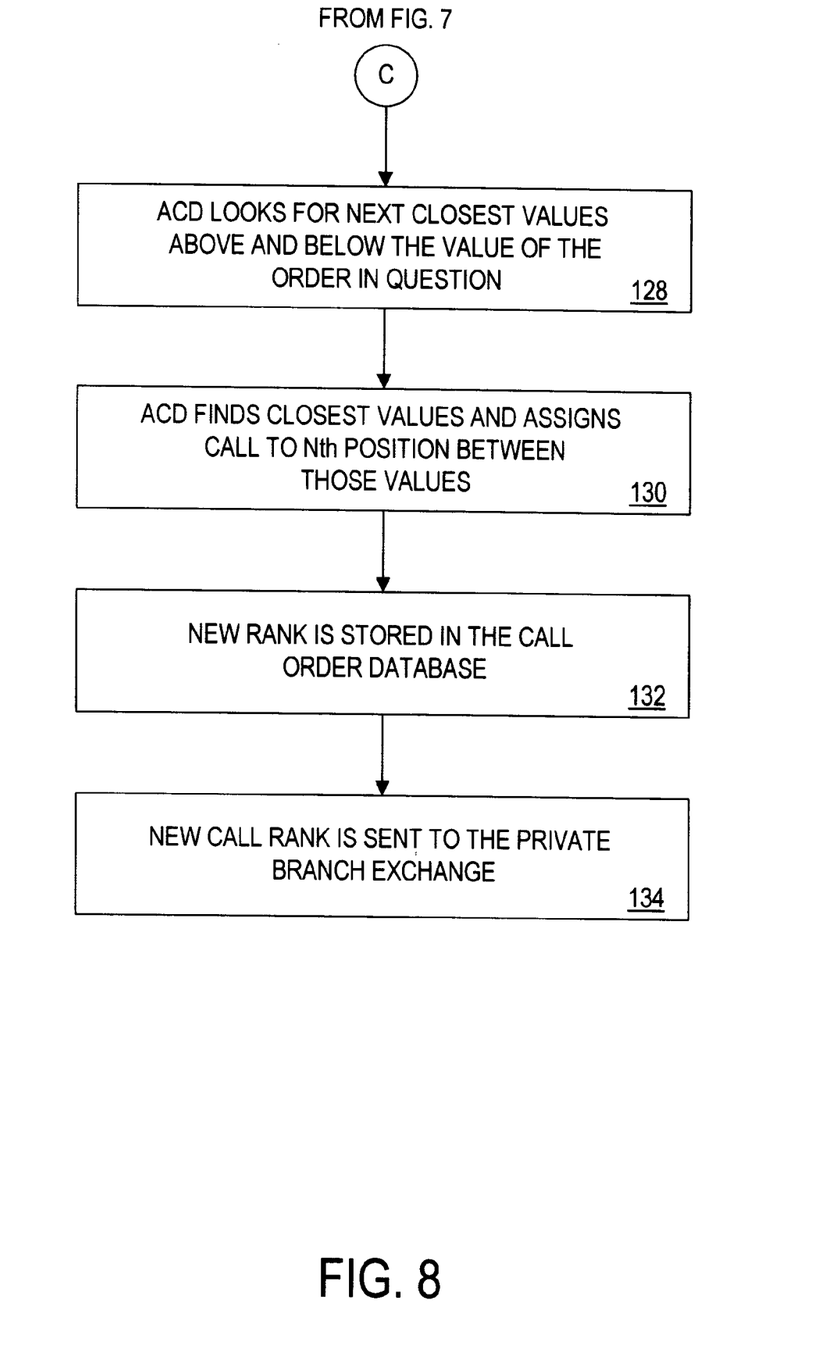

Thereafter, using the procedure illustrated in FIGS. 7 and 8, CPU 52 processes the order information and calculates an economic value for the call (box 117). In this case, the economic value is based, for example, on the total dollar amount of the order, the value of the customer, and may also include the origin of the calling phone number. Using the caller data, CPU 52 updates the entries in product order database 64 that correspond to the call (box 118).

While the present invention has been so far illustrated with respect to the sale/purchase of catalog merchandise, it will be understood that it has broad application to transactions having any measurable economic value. One such relevant application includes the purchase of airline or other travel-related tickets. In such an application, the described process for querying the caller to determine the economic value of the call is implemented by a script having particular relevance to the expected mode of travel—for example the departure location, destination location, and travel dates planned for air travel. With local or remote access to ticket cost data, or general rules for pricing travel, the system can then determine the economic value of the potential airline ticket purchase, and queue the call appropriately.

CPU 52 then compares the assigned economic value for the call to the assigned economic values of calls currently in the call queue (box 119). If the assigned economic value of the call is higher than any calls currently in the queue (decision 120), ACD 12 assigns the call to a first position in the call queue (box 122). If the assigned economic value number of the call is not higher than all calls in the call queue, it is next determined whether the call's assigned economic value number is lower than any calls currently in the queue (box 124). If the call has the lowest value, it is placed in the last position in the call queue (box 126). If neither of the above conditions are present, ACD 12 looks for the next closest assigned economic values above and below the call's assigned economic value (box 128), and assigns the call to a position in the call queue between those two values (box 130). The new rank position for the call is stored in call database 62, and the positions of the remaining calls in the queue are updated accordingly (box 132). Thereafter, the new call rank is sent to the PBX (box 134) to implement the new queue.

The above description assumes that the call will be moved ahead in position in the same call queue. An alternative is to move a call with a relatively high assigned economic value from the call queue in which it is positioned to a priority queue where there is a guarantee of response within a short period of time. While it is preferred that the repositioning of a call in a queue be masked from the caller, the IVRU could cause a message to be passed to a valued customer/caller that his call had been re-positioned in the call queue to achieve a faster response. Such a message might indicate that the repositioning results from a history of past dealings with the customer. This would provide the customer with a sense of reward for his business, and might result in additional future business.

A system incorporating the invention will preferably include safeguards which prevent "low value" calls from being continually pushed down in the queue. For instance, low value calls, once positioned in a queue and repositioned N times can then be interspersed in the call queue among higher value economic calls (and no longer subject to re-positioning) so as to assure their being handled within a reasonable time. Alternative procedures can be determined by those skilled in the art to assure that low value calls are handled, albeit at a slower rate than high value calls, at some point.

It will be understood that the hardware implementation of the system may be varied depending on the environment, however, irrespective of the hardware configuration, the functions described above need to be accomplished to carry out the invention. For example, the ACD may be entirely omitted if the ACD functionality is incorporated into the PBX. Thus, incoming calls would be directly handled by the PBX, which would, in turn, be connected to the IVRU.

It should be understood that the foregoing description is only illustrative of the invention. Various alternatives and modifications can be devised by those skilled in the art without departing from the scope of the invention. For instance, performance of the invention may be accomplished under control of software which is loaded from one or more media disks, with the media disks including the necessary code to cause processing means to carry out the invention. Accordingly, the present invention is intended to embrace all such alternatives, modifications and variances which fall within the scope of the appended claims.

What is claimed is:

1. A method of processing a new incoming telephone call to be handled, comprising:

determining an economic value associated with the new telephone call; and positioning the new telephone call within a queue, containing a plurality of incoming telephone calls, the new telephone call being positioned with a rank based on the determined economic value associated with the new telephone call and economic values associated with the plurality of telephone calls in the queue.

2. The method of claim 1, further comprising:

repositioning the plurality of telephone calls in the queue such that the new telephone call is positioned between two of the plurality of telephone calls.

3. The method of claim 1, further comprising:

handling a telephone call in the queue based on rank.

4. The method of claim 1, wherein said determining an economic value associated with the new telephone call comprises:

receiving from a caller making the new telephone call order information related to an order for goods or services; and determining the economic value associated with the new telephone call based on the received order information.

5. The method of claim 4, wherein the received order information comprises at least one of: a customer identifier; an item identifier; a quantity of items; an item number; an item description; an order price; and a profitability of the order.

6. The method of claim 1, wherein the economic value associated with the new telephone call is based on a past interaction with the caller making the new telephone call.

7. The method of claim 1, wherein the economic value associated with the new telephone call is based on a telephone number from which the new telephone call is made.

8. The method of claim 1, wherein the economic value associated with the new telephone call is based on a telephone number at which the new telephone call is received.

9. The method of claim 1, wherein the new telephone call is related to air travel and the associated economic value is based on information related to at least one of: a departure location, a destination location, and travel dates planned for air travel.

10. The method of claim 1, further comprising:

initially positioning the new telephone call within the queue with a rank not based on the economic value associated with the new telephone call;

wherein said new telephone call is subsequently repositioned in the queue with a rank based on the economic value associated with the new telephone call and the economic values associated with the plurality of telephone calls in the queue.

11. The method of claim 1, further comprising:

informing the caller making the new telephone that the new telephone call will be handled in an expedited manner.

12. The method of claim 1, wherein the rank of the new telephone call is further based on additional information associated with the plurality of telephone calls in the queue, the additional information being configured such that a telephone call will be handled within a reasonable period of time.

13. The method of claim 12, wherein the additional information comprises a number of times a telephone call has been repositioned within the queue.

14. A system for processing a new telephone call to be handled, comprising:

a call processing system; and a voice response unit connected to said call processing system, said call processing system being configured to:

determine an economic value associated with the new telephone call; and position the new telephone call within a queue, containing a plurality of incoming telephone calls, the new telephone call being positioned with a rank based on the economic value associated with the new telephone call and economic values associated with the plurality of telephone calls in the queue.

15. The system of claim 14, wherein said call processing system is further configured to reposition the plurality of telephone calls in the queue such that the new telephone call is placed between two of the plurality of telephone calls.

16. The system of claim 14, wherein said call processing system is further configured to handle a telephone call in the queue based on rank.

17. The system of claim 14, wherein said call processing system is further configured to:

receive from a caller making the new telephone call order information related to an order for goods or services; and determine the economic value associated with the new telephone call based on the received order information.

18. The system of claim 17, wherein the received order information comprises at least one of: a customer identifier; an item identifier; a quantity of items; an item number; an item description; an order price; and a profitability of the order.

19. The system of claim 14, wherein the economic value associated with the new telephone call is based on a past interaction with the caller making the new telephone call.

20. The system of claim 14, wherein the economic value associated with the new telephone call is based on a telephone number from which the new telephone call is made.

21. The system of claim 14, wherein the economic value associated with the new telephone call is based on a telephone number at which the new telephone call is received.

22. The system of claim 14, wherein the new telephone call is related to air travel and the associated economic value is based on information related to at least one of: a departure location, a destination location, and travel dates planned for air travel.

23. The system of claim 14, wherein said call processing system is further configured to:

initially position the new telephone call within the queue with a rank not based on the economic value associated with the new telephone call;

wherein said new telephone call is subsequently repositioned in the queue with a rank based on the economic value associated with the new telephone call and the economic values associated with the plurality of telephone calls in the queue.

24. The system of claim 14, wherein said call processing system is further configured to:

inform the caller making the new telephone that the new telephone call will be handled in an expedited manner.

25. The system of claim 14, wherein the rank of the new telephone call is further based on additional information associated with the plurality of telephone calls in the queue, the additional information being configured such that a telephone call will be handled within a reasonable period of time.

26. The system of claim 25, wherein the additional information comprises a number of times a telephone call has been repositioned within the queue.

27. A system for processing telephone calls, comprising:

means for determining an economic value associated with the new telephone call; and means for positioning the new telephone call within a queue, containing a plurality of incoming telephone calls, the new telephone call being positioned with a rank based on the economic value associated with the new telephone call and economic values associated with the plurality of telephone calls in the queue.

28. An article of manufacture, including instructions recorded on a computer-readable medium operative to control a call processing system, said instructions operative to control the call-processing system to:

determine an economic value associated with the new telephone call; and position the new telephone call within a queue, containing a plurality of incoming telephone calls, the new telephone call being positioned with a rank based on the economic value associated with the new telephone call and economic values associated with the plurality of telephone calls in the queue.

* * * * *